United States Patent [19]

Patel

[11] Patent Number: 4,863,000
[45] Date of Patent: Sep. 5, 1989

[54] BRAKE OR CLUTCH DISC ASSEMBLY
[75] Inventor: Kirit R. Patel, North Royalton, Ohio
[73] Assignee: Eaton Corporation, Cleveland, Ohio
[21] Appl. No.: 263,840
[22] Filed: Oct. 28, 1988
[51] Int. Cl.[4] ............................................. F16D 59/02
[52] U.S. Cl. .................................. 188/170; 188/18 A; 188/218 XL; 192/70.12; 192/113 R
[58] Field of Search ............ 188/170, 218 XL, 264 A, 188/264 AA, 716, 18 A; 192/70.14, 70.12, 113 R, 113 A, 93

[56] References Cited

U.S. PATENT DOCUMENTS

| 2,827,142 | 3/1958 | Aschaver | 192/113 A |
| 3,335,834 | 8/1967 | Wach | 192/70.12 |
| 3,543,901 | 12/1970 | Plankstadt | 188/218 XL |
| 4,049,085 | 9/1977 | Blunier | 188/218 XL |
| 4,078,637 | 3/1978 | Hanks | 188/170 |

FOREIGN PATENT DOCUMENTS 954421  4/1964  United Kingdom ............... 188/71.6

Primary Examiner—Andres Kashnikow
Assistant Examiner—Matthew C. Graham
Attorney, Agent, or Firm—M. L. Union

[57] ABSTRACT

A disc brake or clutch assembly having rotatable rotor discs and non-rotatable discs which are movable axially into engagement. The rotatable rotor discs are secured to an annular splined mounting member which has a plurality of grooves therein to circulate cooling air. The rotor discs have a plurality of holes which enable air to flow between the rotor discs.

5 Claims, 2 Drawing Sheets

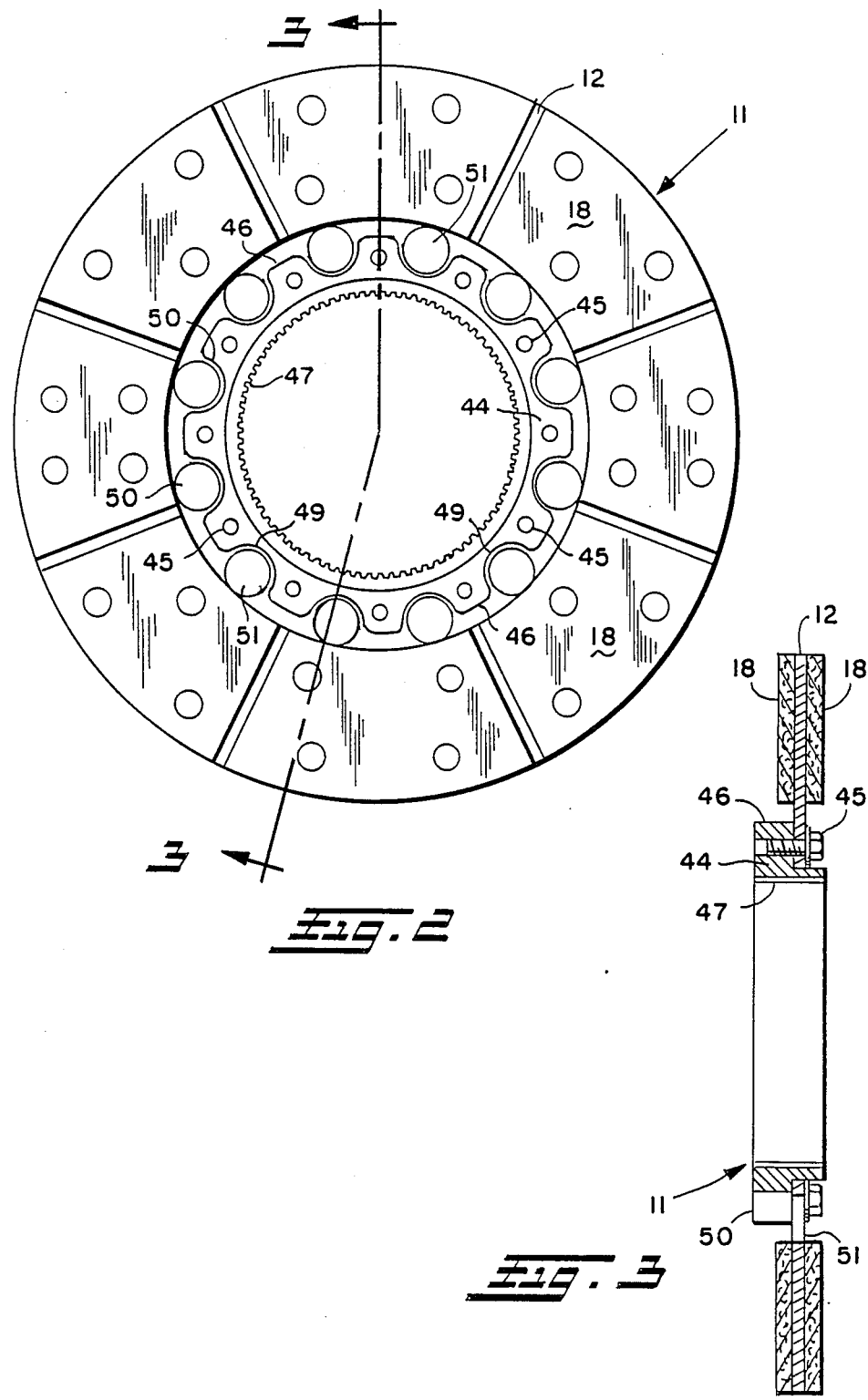

BRAKE OR CLUTCH DISC ASSEMBLY

This invention relates to air cooled disc brakes in which the brake is applied by a spring and released by air pressure or vise versa e.g. the brake is applied by air and released by springs. It will appreciated by those skilled in the art that the invention in its broader sense may be applicable to any such disc type brake or clutch or torque transmitting device.

Torque transmitting devices of the disc type are known in the art and generally comprise an external housing which carries and positions annular axially moveable and fixed reaction members having a disc therebetween. U.S. Pat. Nos. 3,398,822 to Eakin and 4,609,076 to Collins disclose air cooled spring applied brakes or clutches which are air released by pressurization of a pressure chamber to axially move an end plate and pressure plate to overcome the force of the springs. The brake disc in these patents is provided with a spline coacting with an externally splined hub. Naturally, the spline connection between the brake disc and the hub permits the brake disc to slide axially along the hub but necessarily restricts the circulation of air between the brake discs and the pressure plates.

On the other hand, prior art U.S. Patent No. 3,335,834 to Wach discloses an air cooled torque transmitting device of the disc type provided with axially spaced rotor discs and reaction discs, spaced from each other a substantial distance. Blower means extend radially between the reaction discs to blow air radially away from the axis of rotation and between the reaction discs.

It is an object of this invention to provide an improved torque transmitting device in which the rotor discs are splined to the hub and radially inwardly of reaction discs and a blower or impeller means is provided to draw air axially and force it between the rotor discs and the reaction discs to improve the energy absorption capacity of the brake unit.

Another object of the invention is to provide a torque transmitting device in which means for blowing air between the rotor and reaction discs are formed integrally with spline means removably attached to the radially inner portion of the rotor discs.

In the accompanying drawings:

FIG. 2 is a end view of the rotor disc of the brake or clutch shown in FIG. 1.

FIG. 3 is a cross-sectional view taken along the lines 3—3 of FIG. 2.

Figure 1:
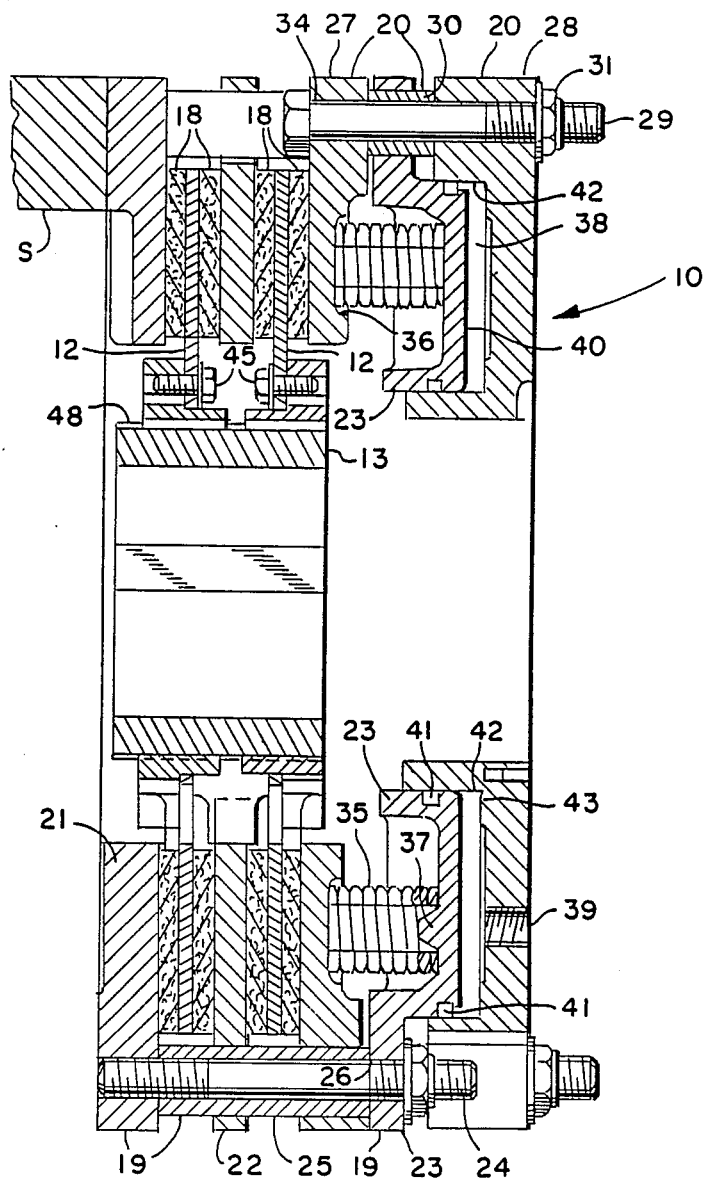
FIG. 1 is an axial sectional view through the spring applied air released brake or clutch of this invention.

Referring to FIGS. 1 through 3, the spring applied brake 10 includes one or more annular radially disposed rotor or rotatable disc assemblies 11 having discs 12 which are spined to a hub 13 for rotation in unison therewith but mounted for limited axial movement along the hub 13. A hub 13 is keyed, welded, or otherwise secured to the shaft (not shown).

A plurality of friction shoes 18, made of friction material, are secured to each side of the brake discs 12. The brake assembly 10 also has a non-rotating structure which includes a rigid, fixed assembly 19 and a rigid axially moveable assembly 20.

The axially fixed assembly 19 includes a fixed spring housing 23 and a fixed reaction disc member 21 rigidly mounted to a stationary support S by suitable fasteners. The disc 21 and spring housing 23 are secured together by the studs or bolts 24 passing through the spacer tubes 25 and also through a hole 26 in the spring housing 23. The holes 26, the spacer tubes 25, and studs 24 are circumferentially spaced apart at the radially outer periphery of the housing 23. The ends of the spacer tubes 25 bear against the axially facing surfaces of the disc 21 and the spring housing 23 and the studs 24 secure the tubes 25 to the disc 21 and spring housing 23 to form an assembly 19. A stator brake disc 22 extends radially between the rotor discs 12 and is provided with a plurality of holes at its outer periphery through which the spacer tubes 25 extend.

The axially movable assembly 20 includes a pressure plate 27, which is secured to the cylinder member 28 by the studs or bolts 29 passing through holes 34 in the plate 27 and in the spacer tubes 30 which are circumferentially spaced apart at the radially outer periphery thereof. The studs 29 pass through holes in the cylinder member 28 and are secured by the nuts 31. The studs 29 and tubes 30 also pass through slots or gaps in the periphery of the spring housing 23. The movable assembly 20 is thus axially slideable a limited distance relative to the axial fixed assembly 19 with the assembly 20 slideable through holes in the pressure plate 27. Also, the movable assembly 20 is supported for axial movement by the annular radially inner facing surface of the spring housing 23 slideably supported on the annular radially outer facing surfaces 42 of the cylinder member 28.

The axially moveable assembly 20 is normally biased to the left of FIG. 1, by a plurality of spring 35 so that the pressure plate 27 bears against the friction disc 18. One end of each of the springs 35 is positioned within a depression 36 in the pressure plate 27. The other end of each of the springs 35 surrounds a projection 37 in the spring housing. Each of the projections 37, the depressions 36 and the springs 35 are of course axially aligned and are located radially inwardly of the respective studs 24 and tubes 25 as well as the studs 29 and spacer tubes 30.

The brake is released by injecting a pressurized fluid into the pressure chamber 38 defined by the annular face 40 of the spring housing 23 having suitable radially inner and outer seals 41 in sealing engagement with the radially facing surfaces 42 and the annular axially facing end surface 43 formed in the cylinder member 28. When pressurized fluid is injected through the orifices 39 into the chamber 38, the axial moveable assembly 20 is moved to the right of FIG. 1 so that the pressure plate 27 thereof is moved a slight distance away from the friction disc 18, thus compressing the springs 35 and releasing the brake. When the pressure plate 27 is moved slightly to the right of FIG. 1, the brake disc 12 will move a slight distance along the hub 13 so that braking forces are relieved between the fixed reaction disc 21 and the friction disc 18.

In accordance with this invention, each of the rotor discs 12 is mounted on the hub 13 for limited axial movement. Specifically, each rotor disc 12 is secured by fasteners 45 to a radial flange 46 formed on the gear or spline member 44. Spline 47 on the member 44 meshes with the spline 48 on the hub 13 to permit limited axial movement of the rotor discs 12 relative to the hub. The radial outer periphery of the radial flange 46 is provided with semicircular grooves 49 extending axially of the gear 44. A groove 49 is positioned between each pair of fasteners 45. The grooves 49 forms radially extending arcuate walls or vanes 50 which positively impell air radially outwardly between the friction shoes 18 and the fixed discs 22 and 27. Each of the rotor discs 12 is provided with axial extending holes 51 preferably of a number equal to the number of grooves 49. The holes 51 are each axially aligned with a groove 49. As the rotor discs rotate, cooling air is drawn axially inwardly toward the stator disc 22 and is partially impeller radially outwardly as well as partially through holes 51 into the space between the friction shoes 18 of the rotor discs 12 and the fixed discs 21, 22 and 27 as shown by the arrows in FIG. 1.

I claim:

1. In a spring-engaged, pressure-fluid disengaged disc brake or clutch assembly having a rotating input member adapted to be fixed to a shaft, a pair of rotor discs, a pair of means for axially movably mounting each rotor disc on said input member and for rotation with said input member, non-rotatable disc means positioned on each side of said rotor discs, friction discs interposed between said rotor discs and non-rotatable disc means, means supporting said non-rotatable discs means for limited movement axially relative to said input member, spring means for biasing all of said non-rotatable disc means and rotor discs axially into engagement with each other in a direction away from one end of said assembly, power means for compressing said spring means to release all of said rotor and non-rotatable discs from engagement with each other, the improvement comprising, said mounting means being annular in shape and having a spline means formed on the I.D. thereof which mesh with a spline means formed on the O.D. of said input member, said rotor discs secured to said mounting means, said mounting means having a plurality of grooves in the radially outer periphery thereof, and said rotor discs having a plurality of holes formed in the inner periphery thereof, said mounting means having a radial outer dimension less than the dimension of the I.D. of said friction discs.

2. A brake or clutch assembly device as claimed in claim 1 in which each rotor disc is secured by removable fasteners to an axially facing surface of said mounting means.

3. A brake or clutch assembly claimed in claim 1 in which said holes are circumferentially aligned with said grooves.

4. A brake or clutch assembly as claimed in claim 1 in which said grooves and holes are spaced circumferentially an equal distance.

5. A brake or clutch assembly as claimed in claim 1 in which the axially facing surface of one mounting means faces the axially facing surface of the other mounting means.

* * * * *